UNITED STATES PATENT OFFICE.

JOHANN PETER ADOLF VOLLMAR, OF KEMPTEN, HESSE, GERMANY, ASSIGNOR TO BERNHARD BUDDE, OF NEW YORK, N. Y.

PREVENTION OF THE FORMATION OF MOLD AND WHITE FILM ON FERMENTABLE AND FERMENTED LIQUIDS.

SPECIFICATION forming part of Letters Patent No. 351,299, dated October 19, 1886.

Application filed May 27, 1886. Serial No. 203,469. (No specimens.) Patented in Germany May 11, 1884, No. 30,451.

*To all whom it may concern:*

Be it known that I, JOHANN PETER ADOLF VOLLMAR, a citizen of the German Empire, residing at Kempten, in the Grand Duchy of Hesse and German Empire, have invented new and useful Improvements in the Prevention of the Formation of Mold and White Film on Fermentable or Fermented Liquids, of which the following is a specification.

The object of this invention is to provide means for preventing the formation of fungus, mold, or similar matter, particularly in or on fermentable or fermented liquids.

In the years 1877 and 1878 Doctor Nessler published a means intended to guard against the formation of fungus, mold, or similar matter in or on liquids, said means consisting of small pieces of wood saturated with paraffine mixed with salicylic acid, said pieces of wood so prepared being spread over the surface of the liquid. It was considered that these floating masses, when placed in filled barrels, would float on the surface of the contents of the barrels, and that as the contents were drawn off and the surface varied the floating masses would continually form a protecting cover on the surface and prevent the entrance into the liquid of spores, which enter the barrels with the air. This last-named method, as also other forms of floating wood, have not proved practically successful, because by the movement of the surface on which they floated these floating particles come to rest over or under one another or to cling to the walls or sides of the barrels. In this way breaks or openings are formed in the protecting-cover.

The method I adopt is to form small spheres or spherical bodies of wax having about five millimeters diameter. These spheres or spherical bodies will not rest under or over one another, nor will they cling to the walls or sides of the barrels. Breaks or openings in the protecting cover or layer are thus avoided. The wax is made antiseptic by being impregnated with sulphurous acid or by being mixed with acid sulphurous salts—as, for example, soda salt or potash salt; or the wax may be mixed with salicylic acid. The sulphurous acid may be easily obtained by the action of copper upon sulphuric acid. The mixing of the various substances with wax can readily be accomplished when the wax is melted or softened.

With regard to the use of salicylic acid as an antiseptic, I would state that according to some opinions hygienic objections have been raised against its use, and said objections have in their turn been controverted.

By the method which I have set forth, salicylic acid can be employed or not, as may prove to be of advantage.

The wax impregnated or mixed with antiseptic, as above set forth, is rolled or formed into balls or spherical masses. This formation of balls or spherical bodies can be accomplished by rolling or by means of a pill-machine, which cuts or presses small particles of the material.

The pills or spherical bodies may be prepared as follows: Finely scraped wax is mixed or kneaded with sulphurous acid, and the mixture is pressed or formed into sheets. The sheets are cut into particles of suitable size, and by means of any suitable well-known mechanism said particles are rolled or formed into balls or given a spherical form; or, in place of the method just described, I can impregnate cork-dust or finely-disintegrated cork with sulphurous acid and mix the impregnated cork with wax. By softening the wax the mixing can be readily accomplished. This mixture is then pressed or formed into sheets and small balls are formed therefrom, as above set forth.

In place of sulphurous acid, I can employ other antiseptics—as, for example, sulphite of lime, sulphite of potash, or salicylic acid, either dry or dissolved in any suitable solvent.

Care must always be taken that the completed pills will be of less specific gravity than the liquid which they are to protect, so that said pills or balls will float on the surface of the liquid. The wax which is used as a base for the pills should be pure, or at any rate freed from all septic substances.

In place of wax, it is evident that I can employ any other non-absorbent of moisture having a sufficiently light specific gravity—as, for example, paraffine.

Instead of forming sheets of the complete material and cutting said sheets into particles and forming said particles into balls or pills, I can also form the balls or pills by a so called "pill-machine." By passing the completed material through a press-cylinder, small bars of any desired diameter can be formed, which bars can then be cut or severed and rolled or formed into pills or spherical masses.

What I claim as new, and desire to secure by Letters Patent, is—

The process of preserving fermentable or fermenting liquids by applying thereto pills or spheres composed of a non-absorbent base, such as wax, and an antiseptic, such as sulphurous acid.

In testimony whereof I have hereunto set my hand and seal in the presence of two subscribing witnesses.

JOH. PETER ADOLF VOLLMAR. [L. S.]

Witnesses:
PHILIPP WENZEL,
CARL ED. HAHN.